United States Patent [19]
Fath, IV

[11] Patent Number: 5,290,056
[45] Date of Patent: Mar. 1, 1994

[54] TRAILER HITCH GUIDE

[76] Inventor: Albert F. Fath, IV, 8257 Claus Rd., Amherst, Ohio 44001

[21] Appl. No.: 32,644

[22] Filed: Mar. 17, 1993

[51] Int. Cl.$^5$ .......................... B60D 1/36; G01C 5/00
[52] U.S. Cl. ................................ 280/477; 280/511; 280/497; 33/264
[58] Field of Search ............. 280/477, 497, 508, 511; 33/264

[56] References Cited

U.S. PATENT DOCUMENTS

| | | | |
|---|---|---|---|
| 3,889,384 | 6/1975 | White | 280/477 X |
| 3,918,746 | 11/1975 | Lehtisaari | 280/477 |
| 4,583,481 | 4/1986 | Garrison | 280/477 X |
| 4,621,432 | 11/1986 | Law | 280/477 |
| 4,666,176 | 5/1987 | Sand | 280/477 |
| 5,113,588 | 5/1989 | Walston | 280/477 X |

FOREIGN PATENT DOCUMENTS 2086325  5/1982  United Kingdom ............... 280/477

*Primary Examiner*—Margaret A. Focarino
*Assistant Examiner*—Carla Mattix
*Attorney, Agent, or Firm*—Michael Sand Co.

[57] ABSTRACT

A trailer hitch guide with a first portion to be mounted on a tractor vehicle, and a second portion to be mounted on a trailer vehicle. The first portion having a guide telescopically mounted to the tractor such that it can be viewed by the tractor operator while the vehicle is in motion. The second portion having a hood telescopically mounted to the trailer drawbar at a height equal to that of the guide. The relative spacial relation between the hood and guide emulating the relative spacial relation between the tractor hitch ball and trailer drawbar, such that when the operator is attempting to couple the tractor to the trailer, he can position the tractor for coupled engagement with the trailer by viewing the relative spacial relation of the two portions of the trailer hitch guide.

11 Claims, 3 Drawing Sheets

TRAILER HITCH GUIDE

BACKGROUND OF THE INVENTION

1. Technical Field

The invention relates generally to an improved trailer hitch of the type for coupling a tractor vehicle to a trailer vehicle. More particularly, the invention relates to a trailer hitch guide. Specifically, the invention relates to apparatus for attachment to an existing trailer hitch which enables the operator of the tractor vehicle to guide a tractor hitch coupler into alignment with the trailer hitch coupler from the operators position in the tractor vehicle.

2. Background Information

Numerous types of hitches have been devised which are mounted on the back of tractor vehicles for coupling engagement with the drawbar of a piece of equipment such as a trailer or the like, which is towed by a tractor. Many of these hitches are provided with locking means to secure a closure latch in a locked position on the particular type of coupler that is mounted on the end of the drawbar of the towed trailer to prevent the latch from becoming disengaged from the coupler during towing of the trailer.

Moreover, most trailers are equipped with a ratchet or crank for supporting the front end of the trailer such that the drawbar is held above the horizontal plane in which the hitch ball lies so that when the hitch ball is positioned vertically under the draw bar, the crank or ratchet may be operated to lower the drawbar onto the hitch ball for coupling engagement. In any event, most hitches provide a means to latch the trailer to the tractor, and means to secure the latch in position after coupling, as well as crank or ratchet means to raise and lower the front of the trailer.

There are various types of hitch constructions available as there are various types of couplers which are attached to the end of the drawbar of a towed trailer. However, there are two main types of drawbar couplers used by the majority of towed trailers. One is the lunette, which is a strong metal circular ring welded to the end of the drawbar. The ring is placed over the hitch ball mounted on the end of a hook shaped projection of the hitch. A closure latch on the hitch is pivotally moved into engagement with the top of the ball and traps the lunette thereon. Normally, the closure latch has a lock associated therewith to prevent the latch from moving upwardly out of its engaged position with the hitch ball.

Another type of coupler is a hooded coupler which has a hollow inverted semispherical-shaped hood mounted on the end of the drawbar. The hood is formed such that it can be placed over the top of the hitch ball and partially encloses the ball when the hood is lowered thereon. The hooded coupler usually will have locking means associated therewith to engage the ball and retain the coupler thereon while the trailer is being towed.

Regardless of which hitch construction is employed when coupling a tractor vehicle to a trailer vehicle, the operator of the tractor vehicle is generally unable to see the actual engagement of the hitch ball attached to the tractor with the drawbar attached to the trailer, as the engagement is generally below the rear window of the tractor vehicle. As such, when coupling the trailer and tractor, the operator of the tractor must back the hitch ball under the drawbar by either trial and error, or by placing helpers on either side of the trailer directing the tractor operator which way to turn so that the hitch ball ultimately will be positioned vertically below the drawbar so that the drawbar can be lowered onto the hitch ball. Neither of the methods heretofore used to align the hitch ball and the trailer drawbar are time efficient. Moreover, often helpers are not available to guide the tractor operator as the hitch ball is positioned under the trailer drawbar.

Therefore, a need exists for a trailer hitch guide where the operator can guide the hitch ball to the correct coupling position under the trailer drawbar so that the same may be lowered into engagement with the hitch ball. Specifically, a need exists for a system, a portion of which is mounted on the tractor, and a portion of which is mounted on the trailer, which portions relative spacial relations emulate the relative spaced relation between the hitch ball carried by the tractor and the drawbar carried by the trailer, except that they are elevated such that the relative spacial relation between the portions may be viewed by the tractor operator.

SUMMARY OF THE INVENTION

Objectives of the invention include providing an improved hitch which incorporates a trailer hitch guide such that a first portion of the trailer hitch guide emulates a hitch ball and is carried by the tractor vehicle, and a second portion of the guide emulates the coupler attached to a trailer drawbar, with each portion elevated such that the relative spacial relation between the portions may be viewed by the tractor operator when the tractor is in motion.

A further objective includes providing such a trailer hitch guide which may be retrofitted to existing trailer hitch arrangements with relative ease.

Another objective is to provide such a guide which will exactly emulate the relative position between the hitch ball and the trailer drawbar coupler in such a manner that the tractor operator knows the relative position of the hitch ball and the trailer drawbar coupler while moving the hitch ball under the coupler, even though the operation is unable to see the actual hitch ball and associated drawbar coupler.

Yet another objective is to provide such a trailer hitch guide which will operate equally well on most hitch arrangements and on most tractor vehicles and trailer vehicles.

A still further objective is to provide such a trailer hitch guide which is of simple construction, which achieves the stated objectives in a simple, effective and inexpensive manner, and which solves problems and satisfies needs existing in the art.

These and other objectives and advantages of the invention are obtained by the improved trailer hitch guide for emulating the relative position of the tractor hitch ball and the trailer drawbar coupler in such a manner that the tractor operator can know the relative position of the tractor ball and the trailer drawbar coupler, the general nature of which may be stated as including a first portion adapted to be mounted to a tractor vehicle; a second portion adapted to be mounted to a trailer drawbar; said first portion having an elevated guidance means extending upwardly for viewing by an operator of a tractor vehicle; and said second portion having a contact plate for at least partially receiving the guidance means such that the relative spacial relation between the guidance means and the contact plate emulates the relative distance between the tractor hitch ball and the trailer drawbar.

BRIEF DESCRIPTION OF THE DRAWINGS

Preferred embodiments of the invention, illustrative of the best modes in which the applicant has contemplated applying the principals, are set forth in the following description and are shown in the drawings and is particularly and distinctly pointed out and set forth in the appended claims.

Similar numerals refer to similar parts throughout the drawings.

DESCRIPTION OF THE PREFERRED EMBODIMENTS

Figure 1:
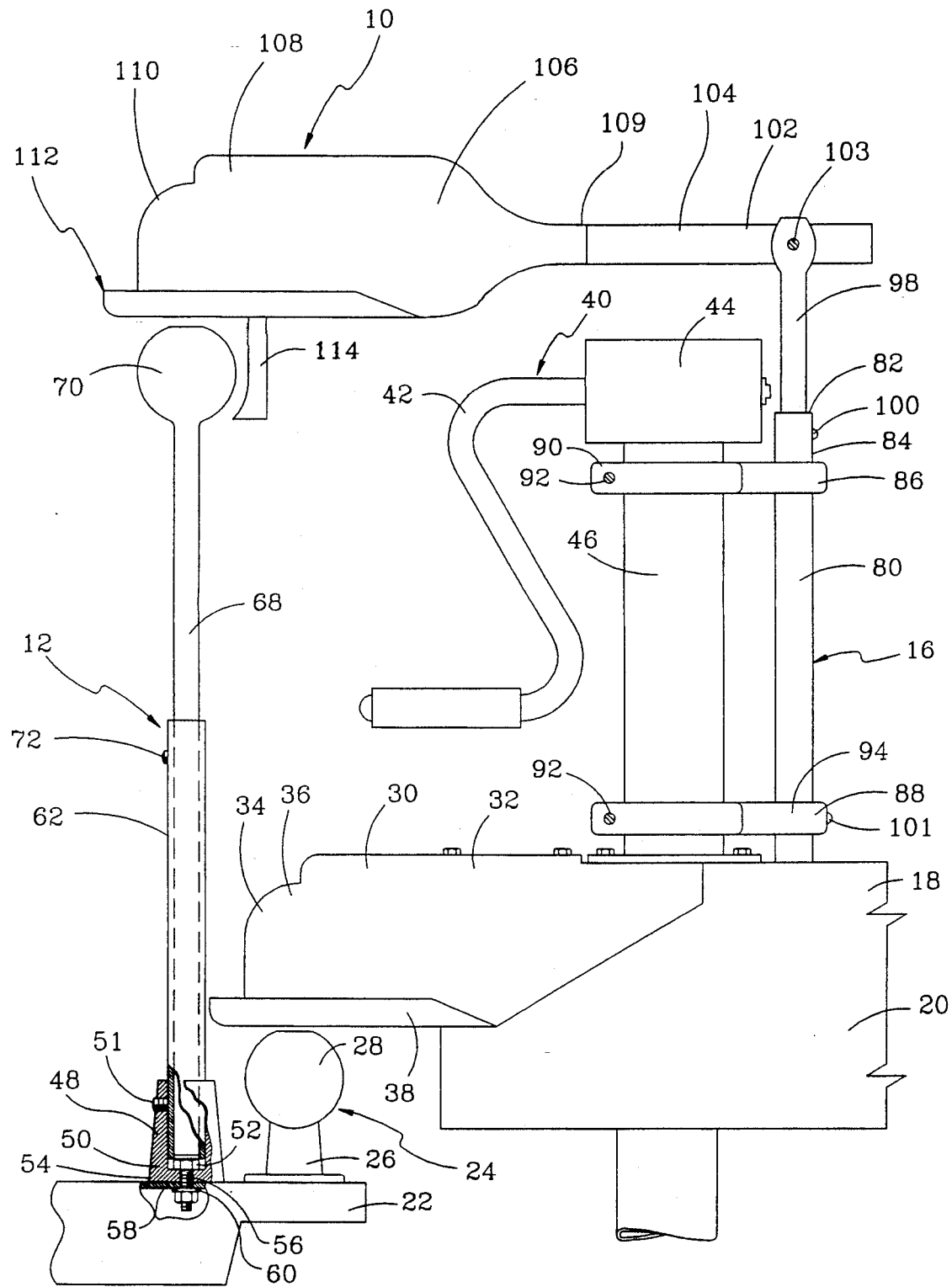
FIG. 1 is a side elevational view of a trailer hitch assembly, with a trailer hitch guide of the present invention associated therewith, having parts cut away and in section showing the attachment of the guide to the tractor vehicle.
Figure 2:
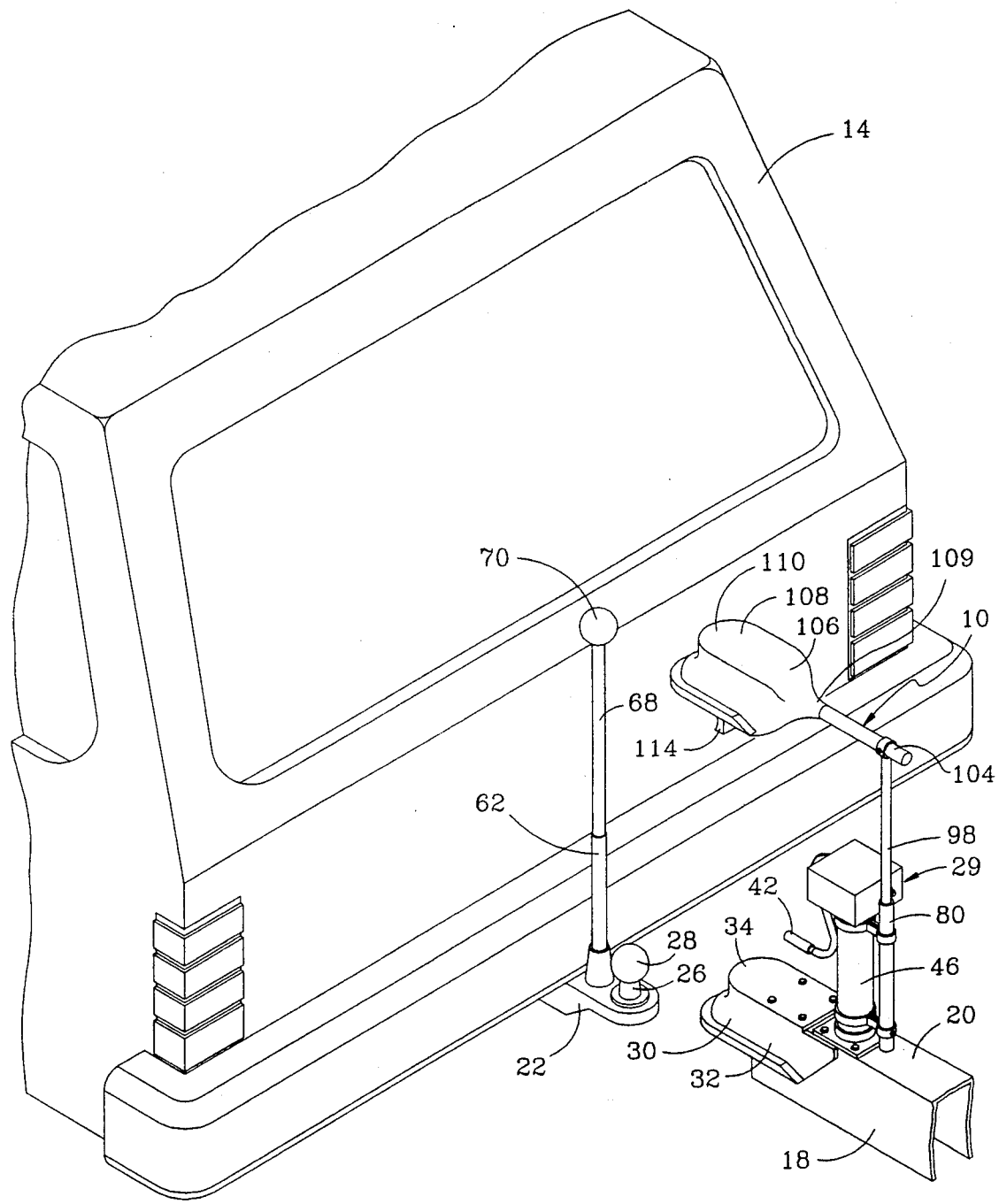
FIG. 2 is a reduced prospective view of the trailer hitch guide mounted on a trailer vehicle and tractor vehicle where the two vehicles are shown near coupled engagement.

In a first embodiment of the invention, the trailer hitch guide is indicated generally at 10, and is shown in FIGS. 1 and 2, and includes a first portion 12 mounted on a tractor frame 14, and a second portion 16 mounted on a drawbar 18 of a trailer vehicle 20, only a small front portion thereof being shown. Tractor vehicle 14 preferably has a mounting tongue 22 extending rearwardly therefrom, with a hitch 24 extending upwardly from mounting tongue 22. Hitch 24 normally has a support post 26 supporting a spherical ball 28 on the top thereof.

In a hooded type coupler indicated generally at 29, which is shown mounted on drawbar 18 of trailer 20, a hood 30 extends outwardly toward hitch 24 when the trailer is near the coupled position. Hood 30 is a channel shaped member having opposing sides 32, which terminate at a free end 34, with a spherical portion 36 which is complementarily shaped with respect to spherical ball 28 of hitch 24. Hood 30 has a turned-up lip 38 which extends from the free end of each side 30 and spherical portion 36, which act as a camming surface for ball 28 should hood 30 not be raised sufficiently to allow ball 28 to pass thereunder when tractor vehicle 14 is coupled with trailer vehicle 20. The hood and ball type coupler shown in FIGS. 1 and 2 for coupling tractor vehicle 14 and trailer vehicle 20 is shown by way of example, and it should be apparent to one of ordinary skill in the art that other coupling arrangement may be utilized in cooperation with the applicant's trailer hitch guide without departing from the spirit of the present invention, such as a lunette type coupler (not shown).

A ratchet or crank indicated generally at 40, is carried by many trailer vehicles as shown in FIG. 1. Crank 40 is usually provided with a crank handle 42 attached to a gear box 44 which houses either a bevel or worm gear, to operatively engage a gear rack in a support pillar 46. Pillar 46 extends through drawbar 18 and has a wheel or support plate (not shown) at the bottom thereof which engages the ground to support the weight of the front of the trailer when it is not supported from hitch 24 of tractor vehicle 14.

In accordance with the invention, first portion 12 of trailer hitch guide 10, has a frusta-conical mounting base 48 with an annular cross-section defining a hollow cavity 50 therein. Cavity 50 has a bottom wall 52 which is parallel to a bottom wall 54 of mounting base 48. An aperture 56 extends though the axial center of both walls 52 and 54, and is in axial alignment with an aperture 58 extending though mounting tongue 22 of tractor 14. Any convenient fastening means may then be employed to mount base 48 to the tractor tongue 22 by passage through the apertures 56 and 58. Two such fastening means are sheet metal screw (not shown) and the nut and bolt arrangement 60 shown in FIG. 1.

As should be readily apparent to one skilled in the art, bottom wall 54 of base 48 may be inclined to mount on an inclined tongue 12, or alternatively to mount on a tractor bumper (not shown) which is normally inclined. The incline of wall 54 is then complementary to that of the tractor bumper to assure that the first portion 12 remains vertical.

A support sleeve 62 having an outer diameter complementary to the inner diameter of hollow cavity 50 of base 48, is mounted therein via a set screw 51 which threadably engages an aperture 66 extending through a sidewall of mounting base 48. As such, support sleeve 62 extends upwardly in a substantially vertical direction. A slide rod 68 having an outer diameter complementary to the inner diameter of sleeve 62, is slidably mounted within sleeve 62. Slide rod 68 has a spherical ball 70 attached to or formed as in integral part of, one end of rod 68. Rod 68 is maintained at an adjusted height by a set screw 72. Again, it should be apparent to one skilled in the art that any means of retaining the relative position between slide rod 68 and support sleeve 62 may be used without departing from the spirit of the present invention.

In further accordance with the present invention, second portion 16 has a support sleeve 80 similar to sleeve 62, and is held in a vertical position by a pair of mounting brackets 86 and 88. As best seen in FIGS. 1 and 2, brackets 86 and 88 each have a large diameter clamp portion 90 which clamps around support pillar 46 of crank 40, via screws 92. A smaller diameter clamp portion 94 extends away from clamp 90 and has a diameter nearly equal to the outer diameter of support sleeve 80. Sleeve 80 is secured in clamp portions 94 of brackets 86 and 88 by clamping screws 96 for retaining the support sleeve in position on support pillar 46.

Slide rod 98 is similar to rod 68, and has an outer diameter complementary to the inner diameter of support sleeve 80, and is adjustably mounted therein by a set screw 100 which passes through sleeve 80 and is tightened against rod 98 to secure rod 98 at a desired height. A round opening 102 is formed at the free end of slide rod 98, with a screw 103 threadably engaging a side wall of opening 102 and extending into the interior thereof. A cantilever bar 104 is slidably adjustably mounted in opening 102 and extends outwardly therefrom, and is orthogonal to slide rod 98. When cantilever bar 104 is positioned as needed, screw 103 is tightened on bar 104 to secure it in position. A hood 106 is mounted on a first end of the cantilever bar 104 and is similar to hood 30, but is manufactured of a lighter weight material, such as plastic. Hood 106 has parallel spaced apart sides 108 and semi-spherically shaped end 110 to complimentarily accept sphere 70. Extending outwardly from sides 108 and end 110 is a curved lip 112 to assist the ball 70 to cam under hood 106, should the hood not be raised sufficiently to allow ball 70 to travel vertically thereunder. A contact plate 114 extends downwardly from hood 106 for subsequent contact with ball 70 as discussed hereinbelow.

Turning to the installation of guide 10 (FIGS. 1 and 2), first portion 12 is attached via nut and bolt 60 such that mounting base 48 is positioned directly behind spherical ball 28. Once mounting base 48 is installed, support sleeve 62 is placed within hollow cavity 50 and secured thereon by set screw 51. Slide rod 68 then is telescopically mounted within sleeve 62. Sphere 70 is positioned at a height that will permit the operator of tractor 14 to view it though the tractor's rear window. Once this height is located, screw 72 is tightened to securely fasten slide rod 68 in support sleeve 62.

Second portion 16 is then mounted such that when tractor 14 and trailer 20 are coupled, the first and second portion of the trailer hitch guide are collinear with the hitch 24. As such, mounting brackets 86 and 88 are positioned with the large diameter clamp around support pillar 46, which on most trailers, is positioned at the center of the trailer 20 for easiest support thereof. Screws 92 are tightened to secure brackets 86 and 88 to support pillar 46. Support sleeve 80 is then placed into smaller clamp portions 94 of brackets 86 and 88 to retain the sleeve therein. Screw 101 is tightened to secure sleeve 80 in bracket 88. Once sleeve 80 is installed, slide rod 98 is placed within the sleeve and adjusted so that hood 106 is at a height where the sphere 70 will contact plate 114 as the tractor and trailer are coupled. When rod 98 is properly positioned, screw 100 is tightened to secure rod 96 within sleeve 80.

Referring to FIG. 2, the relative spacial relation between hood 30 and spherical ball 28 of hitch 24 is emulated by the sphere 70 and hood 106. FIG. 2 further shows the installed trailer hitch guide 10 of the present invention with the sphere 70 and hood 106 both being visible through the rear window of the tractor vehicle 14 by the tractor operator. As the tractor is moved toward the trailer, the sphere 70 will be relatively positioned from hood 106 the same distance as ball 28 is from hood 30. As the tractor operator guides the ball 70 into engagement with hood 106, ball 28 will also be brought into guided engagement with hood 30 thereby allowing the tractor operator to couple the tractor to the trailer simply by watching the relative position of the ball 70 and hood 106. When ball 70 is positioned below hood 106, and is in contact with contact plate 114, the hitch 24 will also be positioned for coupling with hood 30.

Figure 3:
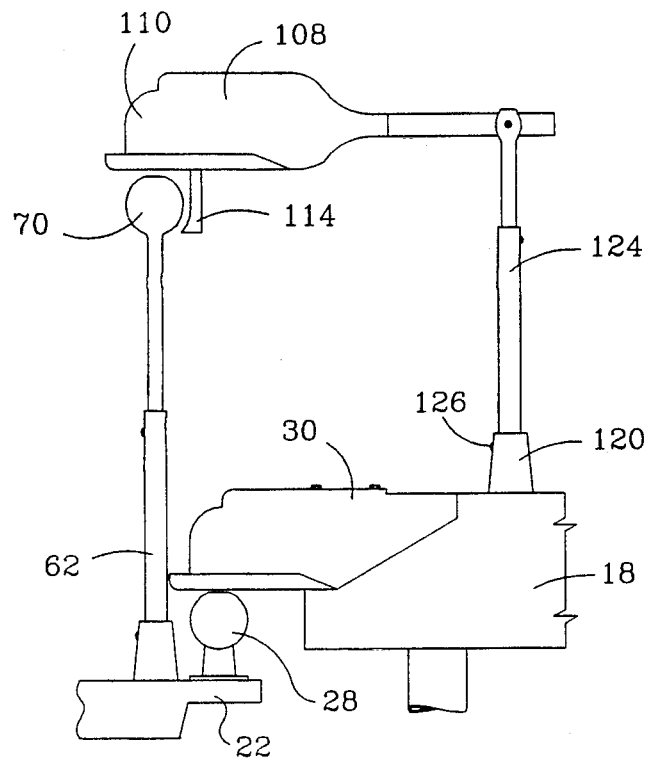
FIG. 3 is a side elevational view of a second embodiment of the present invention.

An alternative embodiment of the present invention is shown at FIG. 3 wherein an alternative mounting system for the second portion of the trailer hitch guide 10 is disclosed for use with a trailer where crank 40 is not positioned in the axial centerline of the trailer; for example, a boat trailer. Particularly, the first portion of the invention operates and mounts in exactly the same way as discussed above. However, inasmuch as no support pillar is positioned in the center of the trailer, brackets 86 and 88 cannot be used for mounting support sleeve 80 on the trailer hitch. Instead, a second mounting base 120 is provided which has a hollow cavity (not shown) and an inner diameter substantially equal to the outer diameter of a support sleeve 124; similar to mounting base 48. Once the base is mounted to the trailer by any convenient attachment means, the support sleeve is secured in the hollow cavity by a screw 126 threadably engaged with base 120 and tightened against the support sleeve. The remainder of the assembly and operation of the trial hitch guide is identical to that discussed above with respect to the first embodiment.

Figure 4:
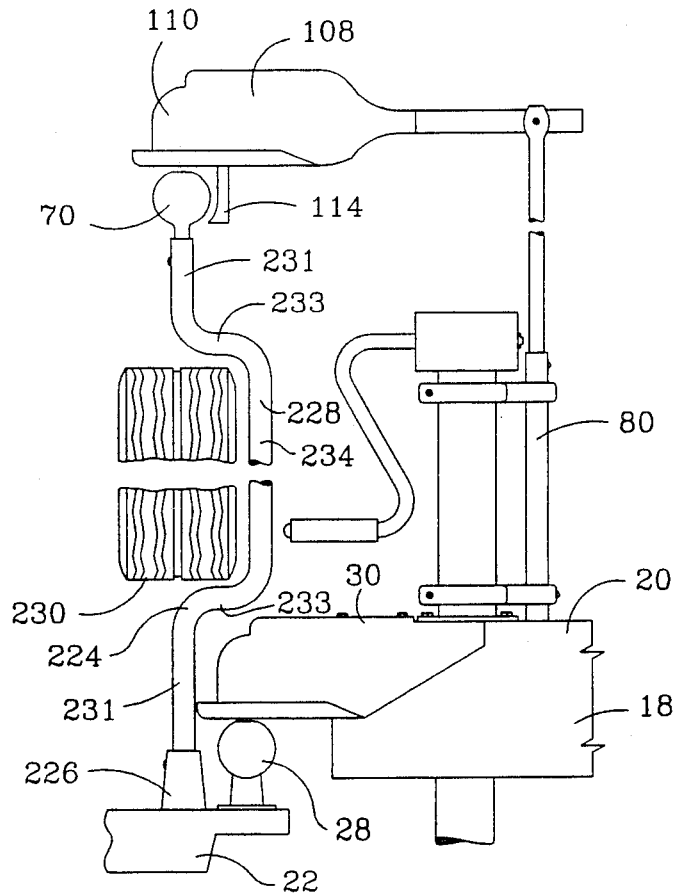
FIG. 4 is a side elevational view of a third embodiment of the present invention.

A third embodiment of the invention is shown in FIG. 4 where the second portion of guide 10 may be mounted in either method described above on the trailer hitch. However, a support sleeve 224 of the first portion of the hitch is formed such that when it is placed in a mounting bracket 226, a central curved portion 228 thereof will provide space for a rearwardly mounted spare tire 230 on tractor 14, as is often present on what is commonly referred to as sport utility vehicles. Curved portion 228 is more particularly described as a support sleeve which has two vertical portions 231 with facing ends of the vertical portions 231 each having a horizontal portion 233 extending outwardly therefrom. A free end of each of the two horizontal portions 233 being connected via a third vertical portion 234. The two horizontal portions 233 and third vertical portion 234 thus defining an area in which a spare tire 230 may fit where the first portion is mounted on a tractor 14.

Accordingly, the improved trailer hitch guide is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved trailer hitch guide is constructed and used, the characteristics of the construction, and the advantageous, new and useful results obtained: the new and useful structures, devices, elements, arrangements, parts and combinations, are set forth in the appended claims.

I claim:

1. A trailer hitch guide for emulating the relative position of a tractor hitch ball and a trailer drawbar in such a manner that a tractor operator can known the relative position of the tractor ball and the trailer drawbar, said hitch guide comprising:

a first portion adapted to be permanently mounted to a tractor vehicle;

a second portion adapted to be permanently mounted to a trailer drawbar;

said first portion having an elevated guidance means extending upwardly for viewing by an operator of a tractor vehicle;

said second portion having a contact plate for at least partially receiving the guidance means such that the relative spacial relation between the guidance means and the contact plate emulates the relative distance between the tractor hitch ball and the trailer drawbar with the vertical distance between the guidance means and the contact plate emulating the relative height between the tractor hitch ball and the trailer drawbar;

said second portion also having a vertical support sleeve adapted to be mounted on the trailer, with the contact plate mounted on said support sleeve at a height corresponding to that of the guidance means; and slide means mounted on top of said support sleeve for providing horizontal adjustment between the contact plate and the support sleeve such that the contact plate remains positioned the same vertical distance above the trailer drawbar during horizontal adjustment.

2. The trailer hitch guide as defined in claim 1 wherein the first portion further comprises a support sleeve having first and second ends; said first end carrying the guidance means; and a mounting base for accepting the second end of said support sleeve.

3. A trailer hitch guide defined in claim 2 wherein the guidance means is a sphere.

4. A trailer hitch guide as defined in claim 2 wherein the guidance means is attached to a slide rod; and in which said slide rod telescopically engages the support sleeve such that said guidance means may be raised and lowered; mounting means for telescopically mounting the slide rod to the support sleeve for moving the slide rod in and out of telescopic engagement with the support sleeve.

5. A trailer hitch guide as defined in claim 1 wherein the contact plate is attached to a slide rod; and in which said slide rod telescopically engages the vertical support sleeve to allow the contact plate to be raised and lowered to a vertically adjusted position.

6. A trailer hitch guide as defined in claim 1 wherein a mounting base accepts a first end of the vertical support sleeve, with a second end of said support sleeve supporting the contact plate.

7. A trailer hitch guide as defined in claim 1 for use with a trailer drawbar having a ratchet casing wherein at least one clamp is provided to attach the second portion vertical support sleeve to the ratchet casing.

8. A trailer hitch guide as defined in claim 4 wherein the support sleeve has two vertical portions with facing ends of said portions each having a horizontal portion extending outwardly therefrom and away from the tractor, a free end of said horizontal portions being connected via a third vertical portion spaced from said tractor a greater distance than said two vertical portions, said two horizontal and said third vertical portion defining an area in which a spare tire may fit when said first portion is mounted on the tractor vehicle.

9. A trailer hitch guide as defined in claim 1 in which the trailer drawbar includes a hood adapted to receive the tractor ball; in which a free end of the slide means includes a simulated hood means for simulating the hood carried by the drawbar; and in which the contact plate is mounted on said simulated hood means and extends downwardly therefrom.

10. In combination, a tractor vehicle having a hitch ball mounted on a rear portion thereof and a trailer vehicle having a coupler mounted thereon for coupling engagement with said hitch ball, and a trailer hitch guide for emulating the relative position of the tractor hitch ball and a trailer coupler in such a manner that a tractor operator knows the relative position of the hitch ball with respect to the trailer coupler, said hitch guide comprising:

a first portion adapted to be permanently mounted on the tractor vehicle;

a second portion adapted to be permanently mounted to the trailer vehicle;

said first portion having an elevated guidance means positioned generally above the hitch ball for viewing by the operator of the tractor vehicle;

said second portion having contact means positioned generally above the trailer coupler for viewing by the tractor vehicle operator and for engagement with the elevated guidance means such that the relative spacial relation between the guidance means and the contact means emulates the relative distance between the tractor hitch ball and the trailer coupler with the vertical distance between the guidance means and the contact means emulating the relative height between the tractor hitch ball and the trailer coupler; p1 said second portion also having a vertical support sleeve adapted to be mounted on the trailer, with the contact means mounted on said support sleeve at a height corresponding to that of the guidance means; and slide means mounted on top of said support sleeve for providing horizontal adjustment between the contact means and the support sleeve such that the contact means remains positioned the same vertical distance above the trailer coupler during horizontal adjustment.

11. A trailer hitch guide for emulating the relative position of a tractor hitch ball and a trailer drawbar, when such trailer drawbar includes a hood adapted to receive the tractor hitch ball, in such a manner that the tractor operator can know the relative position of the tractor ball and the trailer drawbar, said hitch guide comprising:

a) a first support sleeve mounted on the tractor vehicle;

b) a first slide rod telescopically engaging the first support sleeve;

c) first lock means locking the first slide rod on the first support sleeve;

d) a second support sleeve mounted to the trailer vehicle;

e) a second slide rod telescopically engaging the second support sleeve;

f) second lock means for locking the second slide rod on said second support sleeve;

g) guidance means carried by said first slide rod for simulating the trailer ball;

h) simulated hood means for simulating the hood included on the trailer drawbar;

i) a contact plate extending downwardly from said simulating hood for contacting the guidance means when the hood carried by the trailer drawbar and the tractor ball are brought into engagement;

j) horizontal slide means for providing horizontal adjustment of said simulated hood means with a first end of said horizontal slide means engaging a free end of said second slide rod and a second end of said horizontal slide means carrying said simulated hood means;

k) third lock means for locking the slide means on the free end of the second slide rod; and l) said contact plate at least partially receiving the guidance means such that the relative spacial relation between the guidance means and the contact plate emulates the relative distance between the tractor hitch ball and the trailer drawbar with the vertical distance between the guidance means and the contact plate emulating the relative height between the tractor hitch ball and the trailer drawbar.

* * * * *